US011668361B2

(12) United States Patent
De Soccio et al.

(10) Patent No.: US 11,668,361 B2
(45) Date of Patent: Jun. 6, 2023

(54) VEHICLE DISC/BRAKE SYSTEM

(71) Applicants: COFREN S.r.l., Avellino (IT); POLI S.r.l., Camisano (IT)

(72) Inventors: Vittorio De Soccio, Benevento (IT); Roberto Boffelli, Camisano (IT)

(73) Assignee: POLI S.R.L., Camisano (IT)

(*) Notice: Subject to any disclaimer, the term of this patent is extended or adjusted under 35 U.S.C. 154(b) by 282 days.

(21) Appl. No.: 17/023,612

(22) Filed: Sep. 17, 2020

(65) Prior Publication Data
US 2021/0088093 A1 Mar. 25, 2021

(30) Foreign Application Priority Data

Sep. 20, 2019 (IT) .................. 102019000016835

(51) Int. Cl.
F16D 65/12 (2006.01)
B61H 5/00 (2006.01)
C22C 9/00 (2006.01)
C22C 37/08 (2006.01)
C22C 37/10 (2006.01)
F16D 65/092 (2006.01)
F16D 69/02 (2006.01)
F16D 65/02 (2006.01)

(52) U.S. Cl.
CPC ............ F16D 65/125 (2013.01); B61H 5/00 (2013.01); C22C 9/00 (2013.01); C22C 37/08 (2013.01); C22C 37/10 (2013.01); F16D 65/092 (2013.01); F16D 65/121 (2013.01); F16D 69/027 (2013.01); F16D 2065/1312 (2013.01); F16D 2065/1392 (2013.01); F16D 2200/0008 (2013.01); F16D 2200/0013 (2013.01); F16D 2200/0026 (2013.01); F16D 2200/0052 (2013.01)

(58) Field of Classification Search
CPC .... F16D 65/125; F16D 65/092; F16D 65/121; F16D 69/027; F16D 2065/1312; F16D 2200/0013; F16D 2200/0008; F16D 2065/1392; F16D 2200/0026; F16D 2200/0052; C22C 37/08; C22C 37/10; C22C 9/00; B61H 5/00
See application file for complete search history.

(56) References Cited

U.S. PATENT DOCUMENTS

| | | | | |
|---|---|---|---|---|
| 3,239,319 A | * | 3/1966 | Pollard | F16D 69/027 428/614 |
| 4,391,641 A | * | 7/1983 | Lloyd | F16D 69/027 75/235 |
| 5,526,914 A | * | 6/1996 | Dwivedi | F16D 65/127 188/218 XL |
| 2006/0269766 A1 | | 11/2006 | Swank et al. | |
| 2007/0286961 A1 | | 12/2007 | Pahle et al. | |

FOREIGN PATENT DOCUMENTS

| | | | |
|---|---|---|---|
| CN | 100467659 C | | 3/2009 |
| CN | 102560183 A | * | 7/2012 |
| CN | 107604239 A | | 1/2018 |
| EP | 0758059 A1 | | 2/1997 |
| EP | 2692876 A1 | * | 2/2014 |
| EP | 3034902 A1 | | 6/2016 |
| GB | 1109830 A | | 4/1968 |
| JP | H10226842 A | | 8/1998 |
| KR | 20070064725 A | | 6/2007 |
| WO | 9919525 A1 | | 4/1999 |
| WO | 2015159209 A1 | | 10/2015 |

OTHER PUBLICATIONS

Translation of Chinese Patent No. CN 102560183 obtained from website: https://worldwide.espacenet.com on Aug. 22, 2022.*
Translation of Japanese Patent No. JPH 10226842 obtained from website: https://worldwide.espacenet.com on Aug. 22, 2022.*

* cited by examiner

Primary Examiner — Pamela Rodriguez
(74) Attorney, Agent, or Firm — Philip S. Hof; The Small Patent Law Group, LLC

(57) ABSTRACT

A disc/brake friction torque for railway vehicles consisting of at least one pad comprising at least one friction element and a disc. The friction element is made of a sintered material comprising copper, iron, graphite, 0.02 to 1.5% by weight of molybdenum, 1 to 3% by weight of chrome and a porosity ranging from 20 to 35%; and the disc is made of cast iron comprising 0.05 to 2% by weight of chrome, 0.05 to 2% by weight of molybdenum, 0.1 to 2% by weight of nickel.

20 Claims, No Drawings

VEHICLE DISC/BRAKE SYSTEM

CROSS-REFERENCE TO RELATED APPLICATIONS

This patent application claims priority from Italian Patent Application No. 102019000016835 filed on Sep. 20, 2019, the entire disclosure of which is incorporated herein by reference.

TECHNICAL FIELD

This invention relates to a disc/brake friction torque for railway vehicles. In particular, this invention finds advantageous application for medium speed trains, i.e. those trains that have a maximum speed of less than 220 km/h, with particular reference to vehicles with speeds between 140 km/h and 220 km/h.

BACKGROUND

As a person skilled in the art knows, the structure of the brake, in terms of friction elements and disc, depends on the type of train on which the brake is mounted.

The discs are usually made of either steel or cast iron. Steel discs provide greater strength than those made of cast iron and, at the same time, are significantly more costly. For these reasons, the use of steel discs is usually only justified for those trains that have a high speed (above 220 km/h) or a brake mass per disc that would make the use of cast iron discs impossible, due to the high energy to dissipate and the relative power. In fact, for energies that are too high, the stresses on the disc during braking would be such as to compromise the integrity of the cast iron discs.

With reference to the friction elements, these are usually made of sintered or organic material. Due to the high temperatures that develop during braking, the only friction elements that can be used for trains at medium-high speeds (above 160 km/h) are those made of sintered material and not organic material. Friction elements made of organic material suffer from the disadvantage that they have to be replaced very often because of their high consumption (especially when applied to medium/high speed trains) and that their friction performance declines at high temperatures.

With reference to friction elements made of sintered material, it has long been common opinion that they cannot be used in combination with a cast iron disc, since they would cause premature wear of the disc.

The above means that even for medium speed trains, between 160 km/h and 220 km/h, a combination of sintered material friction elements with a steel disc is often adopted. Such a choice also derives from the increasingly demanding, in terms of capacity, vehicle configurations.

Although the use of sintered material friction elements in combination with steel discs provides excellent braking efficiency, it suffers the disadvantage of being particularly costly and producing an irritating screech, particularly at low speeds.

It should be noted that low noise has increasingly become an important determining factor in the choice of disc brakes to be used. As is easily conceived, the need to contain the noise during braking is most strongly felt for those trains that are supposed to make a large number of stops in centres with high residential concentration, such as metropolitan trains.

The need, therefore, was felt to be able to have a brake with a disc/brake friction torque for trains, the technical characteristics of which were such as to make it both cheaper than the current brakes used, and less noisy during braking, thus reducing the irritating screech that is generally produced.

The inventors of this invention have satisfied the above requirement by creating a disc/brake friction torque, in which the friction elements are made of a particular sintered material, while the disc is made of a particular cast iron. The disc/brake friction torque that is the subject of this invention not only meets the above requirements but, surprisingly, also ensures significant advantages in terms of wear resistance of both the disc and friction elements. The possibility of replacing steel discs with cast iron discs greatly reduces the cost of the disc/brake torque as a whole and, surprisingly, significantly reduces the noise produced during braking.

SUMMARY

In at least one embodiment, a disc brake system for a vehicle is provided. The disc brake system includes at least one pad and a disc. The at least one pad includes at least one friction element composed of a sintered material. The sintered material includes copper, iron, graphite, 0.02 to 1.5% by weight of molybdenum, and 1 to 3% by weight of chrome. The disc is composed of cast iron. The cast iron includes 0.05 to 2% by weight of chrome, 0.05 to 2% by weight of molybdenum, and 0.1 to 2% by weight of nickel.

DETAILED DESCRIPTION OF VARIOUS EMBODIMENTS

In order to better understand the invention, a non-limiting embodiment thereof is included below by way of example.

Friction elements have been created, the sintered material of which meets the composition shown in percentages by weight in Table I.

TABLE I

|  | Min % by weight | Max % by weight |
| --- | --- | --- |
| copper | 10 | 70 |
| iron | 5 | 40 |
| graphite | 5 | 20 |
| molybdenum | 0.02 | 1.5 |
| chrome | 1 | 3 |
| Friction modifiers | 5 | 20 |

The sintered material also has a porosity expressed as a percentage (volume of voids compared to total volume) of between 20 and 35%.

In particular, the sintered material has the composition shown in percentages by weight in Table II and has a porosity of 28%.

TABLE II

| copper | 50 |
| --- | --- |
| iron | 30 |
| graphite | 10 |
| molybdenum | 0.75 |
| chrome | 1.25 |
| Friction modifiers | 8 |

The sintered material described above has been tested as a friction element on a cast iron disc made according to this invention (it represents one example of the invention and is indicated with A), on a cast iron disc with a composition that does not meet the requirements of this invention (it represents a first example of comparison and is indicated with B), and on a steel disc (it represents a second example of comparison and is indicated with C).

The cast iron disc according to this invention must meet the composition shown in percentages by weight in Table III.

TABLE III

|  | Min % by weight | Max % by weight |
|---|---|---|
| carbon | 3 | 5 |
| silicon | 1 | 2 |
| manganese | 0.5 | 1 |
| sulphur | 0.01 | 1 |
| phosphorus |  | <0.05 |
| nickel | 0.1 | 2 |
| chrome | 0.05 | 2 |
| molybdenum | 0.05 | 2 |
| copper | 0.1 | 1 |
| Tin, lead, aluminium, titanium |  | <0.01 |
| iron |  | The rest |

In particular, the cast iron disc according to this invention has the composition shown in percentages by weight in Table IV.

TABLE IV

|  | % by weight |
|---|---|
| carbon | 3.3 |
| silicon | 1.7 |
| manganese | 0.8 |
| sulphur | 0.06 |
| phosphorus | 0.02 |
| nickel | 1 |
| chrome | 0.2 |
| molybdenum | 0.5 |
| copper | 0.5 |
| Tin, lead, aluminium, titanium | 0.005 |
| iron | The rest |

Table V shows in % by weight the composition of the cast iron disc, the composition of which does not meet the requirements of this invention

TABLE V

|  | % by weight |
|---|---|
| carbon | 3.5 |
| silicon | 1.7 |
| manganese | 1.02 |
| sulphur | 0.06 |
| phosphorus | 0.023 |
| nickel | 0 |
| chrome | 0.46 |
| molybdenum | 0 |
| copper | 0.7 |
| Tin, lead, aluminium, titanium | 0.005 |
| iron | The rest |

The steel disc used is approved and currently on the market and has the following characteristics 21CrMoV5-11 EN 10028-2 (2003), DIN 17755 (1983)

The sintered material elements described above have been tested on the three types of disc brakes (examples A-C) described above. In particular, the tests were performed on a chassis dynamometer and concerned friction, disc structural integrity, disc wear, friction element wear, and noise tests.

The friction test was performed according to the procedure indicated in the UIC 541-3 ed.7 prog 6A e 6B standard.

The test relating to the disc structural integrity was performed according to the procedure indicated in the EN 14535-3-Class C2 (200 km/h-10t/disc) standard.

The test relating to the disc and friction element wear was performed according to the procedure indicated in the UNI EN 14535-3 standard and according to specific application tests.

The noise test was performed according to the UNI EN ISO 3095:2013 procedure.

Table VI shows the results of the above tests expressed in indexed form in relation to the disc/brake friction torque comprising the steel disc (example C). In this way, it will be extremely simple and immediate to recognise the advantages that the disc/brake friction torque of this invention (example A) entails.

TABLE VI

|  | A | B | C |
|---|---|---|---|
| friction | 100 | 100 | 100 |
| disc structural integrity | 100 | 70 | 100 |
| disc wear | 120 | 40 | 100 |
| friction element wear | 200 | 200 | 100 |
| Noise | 400 | 400 | 100 |

From the data shown in Table VI it can be seen that the disc/brake friction torque that is the subject of this invention (A) not only allows the steel disc to be replaced with a cast iron disc, but also guarantees a significant improvement in terms of wear and noise.

The above results show that, thanks to this invention, it is possible to provide a much more economical disc/brake friction torque for railway vehicles than those with steel discs and, at the same time, to improve performance in terms of disc and friction element wear. With reference to the advantages in terms of cost-effectiveness, it is important to note that the cast iron disc costs about one third of the steel disc.

It is the opinion of the inventors that the above-mentioned advantages of the disc/brake friction torque of this invention derive from the formation on the surface of the disc of a uniformly distributed layer of oxides, consisting mainly of chromium and molybdenum oxides. This layer of oxides is formed during the interaction between the friction elements and the disc and is extremely persistent and firmly anchored to the disc, thus creating a highly protective layer. Using an electron microscope, it has been estimated that this layer is about 5 microns thick.

According to a preferred embodiment of this invention, the pads comprise a plurality of friction elements of reduced sizes, instead of a single, larger friction element. Each pad consists of a main base plate and a plurality of friction elements fixed to the base plate. Each of the friction elements is made up of a metal sheet and a friction plug permanently fixed to the metal sheet.

The solution relating to the use of a plurality of friction elements of reduced sizes is advantageous both in terms of the efficiency of the pressure on the disc and, therefore, of braking, and also in terms of low noise.

Again according to a preferred embodiment of this invention, the disc is composed of at least three circular sectors separated from each other and held together to form the disc from a plurality of transverse pins. The disc made thus is described in the patent application EP0758059 A1 included here for reference.

The invention claimed is:

1. A disc brake system comprising:
at least one pad including at least one friction element composed of a sintered material, the sintered material comprising copper, iron, graphite, 0.02 to 1.5% by weight of molybdenum, and 1 to 3% by weight of chrome; and
a disc composed of cast iron, the cast iron comprising 0.05 to 2% by weight of chrome, 0.05 to 2% by weight of molybdenum, and 0.1 to 2% by weight of nickel, wherein the at least one pad and the disc are configured to be installed onboard a vehicle, and the sintered material of the at least one friction element is configured to contact the disc during a brake application.

2. The disc brake system according to claim 1, wherein the sintered material of the at least one friction element comprises 0.05 to 1% by weight of molybdenum and 1 to 1.5% by weight of chrome.

3. The disc brake system according to claim 2, wherein the sintered material of the at least one friction element comprises 0.75% by weight of molybdenum and 1.25% by weight of chrome.

4. The disc brake system according to claim 1, wherein the sintered material of the at least one friction element comprises 10 to 70% by weight of copper, 5 to 40% by weight of iron, 5 to 20% by weight of graphite, and 5 to 20% by weight of friction modifiers.

5. The disc brake system according to claim 1, wherein the cast iron of the disc comprises 0.1 to 2% by weight of chrome, 0.1 to 2% by weight of molybdenum, and 0.5 to 1.5% by weight of nickel.

6. The disc brake system according to claim 1, wherein the cast iron of the disc comprises 3 to 5% by weight of carbon, 1 to 2% by weight of silicon, 0.5 to 1% by weight of manganese, and 0.01 to 1% by weight of sulfur.

7. The disc brake system according to claim 1, wherein the at least one pad comprises a base plate and a plurality of the friction elements fixed to the base plate.

8. The disc brake system according to claim 1, wherein the disc comprises at least three circular sectors and a plurality of transverse pins, the at least three circular sectors being separate from one another and held together via the transverse pins.

9. The disc brake system according to claim 1, wherein the sintered material of the at least one friction element has a porosity ranging from 20 to 35%.

10. The disc brake system according to claim 9, wherein the sintered material of the at least one friction element has a porosity ranging from 25 to 30%.

11. The disc brake system according to claim 1, wherein each of the at least one friction element comprises a metal sheet and a friction plug fixed to the metal sheet.

12. The disc brake system according to claim 1, wherein the cast iron of the disc comprises 0.2% by weight of chrome, 0.5% by weight of molybdenum, and 1% by weight of nickel.

13. A disc brake system comprising:
multiple friction elements composed of a sintered material, the sintered material comprising 0.02 to 1.5% by weight of molybdenum, 1 to 3% by weight of chrome, 10 to 70% by weight of copper, 5 to 40% by weight of iron, and 5 to 20% by weight of graphite, the sintered material having a porosity ranging from 20 to 30%; and
a disc composed of cast iron, the cast iron comprising 0.05 to 2% by weight of chrome, 0.05 to 2% by weight of molybdenum, 0.1 to 2% by weight of nickel, 3 to 5% by weight of carbon, 1 to 2% by weight of silicon, 0.5 to 1% by weight of manganese, and 0.01 to 1% by weight of sulfur.

14. The disc brake system of claim 13, wherein the sintered material comprises 0.05 to 1% by weight of molybdenum and 1 to 1.5% by weight of chrome.

15. The disc brake system of claim 13, wherein the cast iron of the disc comprises 0.1 to 2% by weight of chrome, 0.1 to 2% by weight of molybdenum, and 0.5 to 1.5% by weight of nickel.

16. The disc brake system of claim 13, wherein the sintered material has a porosity ranging from 25 to 30%.

17. The disc brake system of claim 13, wherein the disc comprises at least three circular sectors and a plurality of transverse pins, the at least three circular sectors being separate from one another and held together via the transverse pins.

18. A disc brake system comprising:
a pad comprising at least one friction element composed of a sintered material, the sintered material comprising copper, iron, graphite, 0.05 to 1% by weight of molybdenum, and 1 to 1.5% by weight of chrome; and
a disc composed of cast iron, the cast iron comprising 0.1 to 2% by weight of chrome, 0.1 to 2% by weight of molybdenum, and 0.5 to 1.5% by weight of nickel, wherein the pad and the disc are configured to be installed onboard a vehicle, and the sintered material of the at least one friction element is configured to contact the disc during a brake application.

19. The disc brake system of claim 18, wherein the sintered material of the at least one friction element comprises 0.75% by weight of molybdenum and 1.25% by weight of chrome, and the cast iron of the disc comprises 0.2% by weight of chrome, 0.5% by weight of molybdenum, and 1% by weight of nickel.

20. The disc brake system of claim 18, wherein the sintered material of the at least one friction element has a porosity ranging from 20 to 30%.

* * * * *